United States Patent Office 3,395,115
Patented July 30, 1968

3,395,115
CHLORINATED BENZOPHENONE LIGHT
STABILIZERS
Jerry Peter Milionis and Frank Joseph Arthen, Jr., Franklin Township, Somerset County, N.J., assignors to American Cyanamid Company, Stamford, Conn., a corporation of Maine
No Drawing. Filed May 24, 1966, Ser. No. 552,439
5 Claims. (Cl. 260—45.95)

ABSTRACT OF THE DISCLOSURE

A composition comprising a polymer and a stabilizing amount of a compound of the formula

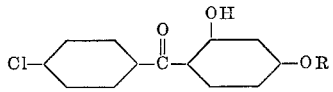

wherein R is an alkyl radical of 8–12 carbon atoms.

---

This invention relates to new o-hydroxybenzophenones useful as light stabilizers; and more particularly to 2-hydroxy-4-alkoxy-4'-chlorobenzophenones where the alkoxy radical has from 8 to 12 carbon atoms, and to their use in stabilizing polymeric plastic compositions against the deteriorative effects of light.

Various types of o-hydroxybenzophenones have been used as ultraviolet absorbers for protecting polymeric plastic compositions against the deteriorative action of ultraviolet light. For example, 2-hydroxy-4-octyloxybenzophenone has found wide commercial application as a useful stabilizer for various substrates and particularly for polypropylene and polyvinylchloride. In many uses under normal conditions, this gives superior protection. However, under certain conditions and for certain applications serious difficulties arise. Thus, for example, in those applications where extremely high temperatures are encountered, for example in the spinning of polypropylene multifilament, the ordinary light stabilizers become volatilized and this poses several problems. The condensed vapors interfere with the operation of the equipment and so much stabilizer material may be lost from the composition that insufficient protection is afforded by the remaining stabilizer. Thus, for such high temperature conditions, there is a definite need for a class of stabilizers which are both effective and of sufficiently low volatility. It is an object of this invention to provide such a class of stabilizers. Other objects will become apparent from the following description of this invention.

In accordance with the present invention, these and other objects have been accomplished in a surprisingly simple and effective manner.

The present invention is based on the discovery that 4'-chloro derivatives of 2-hydroxy-4-alkoxybenzophenones of the Formula I:

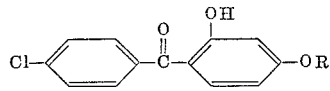

wherein R is alkyl of from 8 to 12 carbon atoms, are extremely useful stabilizing materials in various polymeric substrates, particularly those which encounter high processing temperatures. The 4'-chloro derivatives are of low volatility and are stable at high temperatures.

The superior high temperature characteristics of the compounds of this invention are surprising. Thus, the 4'-chloro derivatives of other hydroxybenzophenones (e.g. 2-hydroxy-4-methoxybenzophenone) do not have superior low volatility characteristics. In addition, although the volatility characteristics may be improved in some instances, over-all effectiveness as a stabilizer may suffer due to other factors such as a decrease in absorptivity or a shift to an undesirable range of absorption.

The compounds of the invention are useful in various polymeric substrates such as polyolefins such as polypropylene and polyethylene, copolymers of ethylene and propylene, polyvinylchloride polyamides, polycarbonates, polyformaldehyde and polymeric fluorocarbons. Normally, they are used in a concentration of about 0.1% to 5.0%. For special purposes as in high temperature processing procedures for polypropylene multifilament extrusion, useful concentrations are in the range of 0.2% to 2.0% based on the weight of the polymer.

The compounds of the invention may conveniently be prepared by alkylation of 4'-chloro-2,4-dihydroxybenzophenone. The latter intermediate may be obtained by reaction of parachlorobenzoyl chloride with resorcinol in the presence of anhydrous aluminum chloride in a solvent such as dimethylformamide. chlorobenzene or a combination thereof. The final alkylation step is conveniently effected with the appropriate alkyl bromide reacted with the dihydroxy compound in an aqueous solvent in the presence of an acid acceptor such as sodium carbonate.

This invention is further illustrated by the examples which follow.

Example 1.—4'-chloro-2,4-dihydroxybenzophenone

To a mixture of 484 parts of resorcinol, 588 parts of anhydrous aluminum chloride, 19 parts of dimethylformamide and 2,200 parts of chlorobenzene was added over a one-half hour period, 700 parts of p-chlorobenzoyl chloride keeping the temperature under 50° C. The mixture was then heated to 80° C. over one hour and held at this temperature for 2.5 hours. The mixture was then drowned in 1,000 parts of ice water and 400 parts of concentrated HCl. After heating the mixture to 100° C., the aqueous layer was removed. The organic layer was washed with hot water and then steam-stripped to remove chlorobenzene. After cooling, the product was removed and dried.

Example 2.—4'-chloro-2-hydroxy-4-octyloxybenzophenone

A mixture of 500 parts of crude 4'-chloro-2,4-dihydroxybenzophenone prepared as in Example 1, 425 parts of n-octyl bromide and 210 parts of sodium bicarbonate in 1940 parts of sec-butyl alcohol and 640 parts of water, was refluxed for 21 hours. The mixture was then treated with 20 parts RB carbon, filtered and cooled to 5° C. The product which separated was collected, washed with cold sec-butyl alcohol and then recrystallized from about 1,200 parts of sec-butyl alcohol. After washing with 400 parts of ice-cold sec-butyl alcohol, the product was obtained as a pale yellow solid melting at 61–62° C.

Example 3.—4'-chloro-2-hydroxy-4-dodecyloxybenzophenone

By the use of an equivalent amount of n-dodecyl bromide in place of n-octyl bromide in the procedure of Example 2, the corresponding 4'-chloro-2-hydroxy-4-dodecyl oxybenzophenone is prepared, melting at 60.5–62° C.

The corresponding decyloxy derivative is obtained using n-decyl bromide in the foregoing procedures.

Example 4.—Evaluation in polyethylene

Samples of the compound, 4'-chloro-2-hydroxy-4-octyloxybenzophenone, prepared as described in Example 2 and 2-hydroxy-4-methoxy-4'-chlorobenzophenone were separately incorporated into low density polyethylene by milling and molding to films of 5 to 6 mil thickness. These were then exposed in a Fade-O-meter and after 200, 500 and 800 hours, the percent carbonyl was determined. The carbonyl formation is an index of the degree of degradation of the polymer on exposure in the Fade-O-meter. The results are shown in Table I which follows. These results indicate the superiority of the compound of Example 2. The films were further analyzed spectrophotometrically and the percent absorber remaining is shown in Table II.

TABLE I.—EVALUATION IN POLYETHYLENE

| 0.5% Additive | FOM Exposure | | |
|---|---|---|---|
| | 200 hours | 500 hours | 800 hours |
| | Percent Carbonyl | | |
| Control (no additive) | 0.15 | 0.48 | |
| 4'-chloro-2-hydroxy-4-methoxybenzophenone | 0.01 | 0.17 | |
| 4'-chloro-2-hydroxy-4-octyloxybenzophenone | 0.01 | 0.04 | 0.09 |

TABLE II

| 0.5% Additive | FOM Exposure | |
|---|---|---|
| | 100 hours | 500 hours |
| | Percent Absorber Remaining | |
| 4'-chloro-2-hydroxy-4-methoxybenzophenone | 50 | 0 |
| 4'-chloro-2-hydroxy-4-octyloxybenzophenone | 100 | 75 |

Example 5.—Volatility measurements

Thermogravimetric analysis at a 10° rise per minute showed that the temperature ($T_{10}$) at which a 10% loss of the compound of Example 2 occurs is twenty degrees higher than another standard U.V. absorber. This indicates that at high temperature processing conditions normally used for the extrusion of polypropylene multifilaments, the 4'-chloro compound of this invention would have greater utility.

TABLE III.—THERMOGRAVIMETRIC PROPERTIES

Additive (0.5%): ($T_{10}$), °C.
   2-hydroxy-4-octyloxybenzophenone _____ 276
   4'-chloro-2-hydroxy-4-octyloxybenzophenone __ 296

We claim:
1. A composition comprising a polymer and a stabilizing amount of a compound of the formula:

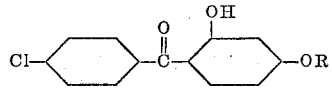

wherein R is an alkyl radical of 8–12 carbon atoms.

2. The composition of claim 1 wherein the compound is present in a concentration of 0.1 to 5.0% based on the weight of the polymer.

3. The composition of claim 1 wherein the polymer is derived from an olefin of 2–4 carbon atoms.

4. The composition of claim 3 wherein the polymer is polypropylene.

5. The composition of claim 4 wherein the compound is 4'-chloro-2-hydroxy-4-octyloxybenzophenone.

References Cited

UNITED STATES PATENTS

| 2,892,872 | 6/1959 | Forster | 260—45.95 |
| 3,188,298 | 6/1965 | Williamson et al. | 260—45.95 |
| 3,192,179 | 6/1965 | Spatz et al. | 260—45.95 |

FOREIGN PATENTS 789,070    1/1958    Great Britain.

DONALD E. CZAJA, *Primary Examiner.*

H. E. TAYLOR, JR., *Assistant Examiner.*

UNITED STATES PATENT OFFICE
CERTIFICATE OF CORRECTION

Patent No. 3,395,115                                                             July 30, 1969

Jerry Peter Milionis et al.

It is certified that error appears in the above identified patent and that said Letters Patent are hereby corrected as shown below:

Column 1, line 61, insert -- I -- under the formula. Column 2, line 19, "dimethylformamide." should read -- dimethylformamide, --. Column 3, TABLE II, the subheading to columns 2 and 3, "Percent Absorber Remaining" should appear as the main heading to the table.

Signed and sealed this 31st day of March 1970.

(SEAL)
Attest:

Edward M. Fletcher, Jr.                                          WILLIAM E. SCHUYLER, JR.
Attesting Officer                                                      Commissioner of Patents